United States Patent
Styles et al.

(10) Patent No.: US 8,042,527 B2
(45) Date of Patent: Oct. 25, 2011

(54) COORDINATION OF HP AND LP EGR

(75) Inventors: Daniel Joseph Styles, Canton, MI (US); David Joseph Dronzkowski, Sterling Heights, MI (US); Eric Kurtz, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/851,238

(22) Filed: Aug. 5, 2010

(65) Prior Publication Data
US 2011/0162626 A1  Jul. 7, 2011

(51) Int. Cl.
F02M 25/07  (2006.01)

(52) U.S. Cl. ............... 123/568.12; 123/568.21

(58) Field of Classification Search .......... 123/568.12, 123/568.21
See application file for complete search history.

(56) References Cited

U.S. PATENT DOCUMENTS

| | | | |
|---|---|---|---|
| 6,067,973 A | 5/2000 | Chanda et al. | |
| 6,651,432 B1 | 11/2003 | Gray, Jr. | |
| 6,742,331 B2 | 6/2004 | Minami | |
| 6,820,599 B2 | 11/2004 | Kurtz et al. | |
| 6,868,668 B2 | 3/2005 | Suzuki | |
| 6,981,375 B2 | 1/2006 | Sisken et al. | |
| 7,043,914 B2 | 5/2006 | Ishikawa | |
| 7,047,741 B2 | 5/2006 | Gray, Jr. | |
| 7,273,045 B2 | 9/2007 | Kurtz et al. | |
| 7,284,366 B2 | 10/2007 | Kurtz | |
| 7,367,188 B2 * | 5/2008 | Barbe et al. | 60/605.2 |
| 7,444,804 B2 | 11/2008 | Hashizume | |
| 7,681,394 B2 | 3/2010 | Haugen | |
| 7,836,693 B2 * | 11/2010 | Fujita et al. | 60/605.2 |
| 2003/0213231 A1 | 11/2003 | Tabata | |
| 2004/0050047 A1 | 3/2004 | Arnold | |
| 2006/0266019 A1 | 11/2006 | Ricart-Ugaz | |
| 2007/0079614 A1 * | 4/2007 | Barbe et al. | 60/605.2 |
| 2007/0119172 A1 * | 5/2007 | Barbe et al. | 60/605.2 |
| 2007/0246028 A1 * | 10/2007 | Fujita et al. | 123/568.12 |
| 2008/0006024 A1 | 1/2008 | Tahara et al. | |
| 2008/0022677 A1 * | 1/2008 | Barbe et al. | 60/599 |
| 2008/0034739 A1 | 2/2008 | Ranalli | |

(Continued)

FOREIGN PATENT DOCUMENTS

EP  1 808 591 A2  7/2007

(Continued)

OTHER PUBLICATIONS

Hepburn, Jeffrey S. et al., "Methods and Systems for Emission System Control," U.S. Appl. No. 12/645,780, filed Dec. 23, 2009, FGT093102U01, 43 pages.

(Continued)

Primary Examiner — Stephen K Cronin
Assistant Examiner — Arnold Castro
(74) Attorney, Agent, or Firm — Julia Voutyras; Alleman Hall McCoy Russell & Tuttle LLP

(57) ABSTRACT

A method for charging an intake manifold of an engine comprises adjusting an LP EGR flow rate and an uncooled HP EGR flow rate within first limits to maintain a target dilution level in the intake manifold at steady-state. The method further comprises adjusting the LP EGR and uncooled HP EGR rates within second limits, different from the first, to maintain the target dilution level in the intake manifold during transient conditions.

5 Claims, 7 Drawing Sheets

U.S. PATENT DOCUMENTS

| | | | |
|---|---|---|---|
| 2008/0092861 A1 | 4/2008 | Duffy et al. | |
| 2008/0209889 A1 | 9/2008 | Scheinert | |
| 2008/0295514 A1 | 12/2008 | Ono | |
| 2009/0063023 A1 | 3/2009 | Nagae | |
| 2009/0132153 A1* | 5/2009 | Shutty et al. | 60/605.2 |
| 2009/0223221 A1 | 9/2009 | Onishi et al. | |
| 2009/0288392 A1 | 11/2009 | Yang et al. | |
| 2010/0043761 A1 | 2/2010 | Joergl et al. | |
| 2010/0064686 A1 | 3/2010 | Mondori | |

FOREIGN PATENT DOCUMENTS

| | | |
|---|---|---|
| EP | 1 892 400 B1 | 7/2009 |
| JP | 2002174110 A | 6/2002 |
| JP | 2002339810 | 11/2002 |
| JP | 2004340138 | 11/2004 |
| JP | 2005002991 | 1/2005 |
| JP | 2005054771 | 3/2005 |
| JP | 2005207281 | 8/2005 |
| JP | 2006503208 | 1/2006 |
| JP | 2006183508 | 7/2006 |
| JP | 2008069690 | 3/2008 |
| JP | 2008128046 | 6/2008 |
| JP | 2008128048 | 6/2008 |
| JP | 2008183509 | 8/2008 |
| JP | 2009121330 | 6/2009 |
| JP | 2009127496 | 6/2009 |
| JP | 2009127497 | 6/2009 |
| WO | 2008050900 A1 | 5/2008 |
| WO | 2008087513 A1 | 7/2008 |
| WO | 2008087515 A2 | 7/2008 |

OTHER PUBLICATIONS

Hepburn, Jeffrey S. et al., "Methods and Systems for Emission System Control," U.S. Appl. No. 12/645,793, filed Dec. 23, 2009, FGT093102U02, 46 pages.

Hepburn, Jeffrey S. et al., "Methods and Systems for Emission System Control," U.S. Appl. No. 12/645,809, filed Dec. 23, 2009, FGT093102U03, 43 pages.

Hepburn, Jeffrey S. et al., "Methods and Systems for Emission System Control," U.S. Appl. No. 12/645,826, filed Dec. 23, 2009, FGT093102U01, 44 pages.

* cited by examiner

COORDINATION OF HP AND LP EGR

TECHNICAL FIELD

This application relates to the field of motor-vehicle engineering, and more particularly, to exhaust-gas recirculation (EGR) in motor-vehicle engine systems.

BACKGROUND AND SUMMARY

A boosted engine may exhibit higher combustion and exhaust temperatures than a naturally aspirated engine of equivalent output power. Such higher temperatures may increase nitrogen-oxide (NOX) emissions and cause accelerated materials ageing in the engine and associated exhaust system. Exhaust-gas recirculation (EGR) is one approach for combating these effects. EGR strategies reduce the oxygen content of the intake air charge by diluting it with exhaust. When the diluted air-exhaust mixture is used in place of ordinary air to support combustion in the engine, lower combustion and exhaust temperatures result. EGR also improves fuel economy in gasoline engines by reducing throttling losses and heat rejection.

In a boosted engine system equipped with a turbocharger compressor and a turbine, exhaust may be recirculated through a high pressure (HP) EGR loop or a low-pressure (LP) EGR loop. In the HP EGR loop, the exhaust is drawn from upstream of the turbine and is mixed with intake air downstream of the compressor. In the LP EGR loop, the exhaust is drawn from downstream of the turbine and is mixed with intake air upstream of the compressor. HP and LP EGR strategies achieve optimum efficacy in different regions of the engine load-speed map. For example, on boosted gasoline engines running stoichiometric air-to-fuel ratios, HP EGR is desirable at low loads, where intake vacuum provides ample flow potential; LP EGR is desirable at higher loads, where the LP EGR loop provides the greater flow potential. Various other tradeoffs between the two strategies exist as well, both for gasoline and diesel engines. Such complementarity has motivated engine designers to consider redundant EGR systems having both an HP EGR loop and an LP EGR loop.

In boosted diesel engines especially, the EGR flow rates needed to keep NOX emissions within acceptable limits are quite high. This can result in a number of issues. First, high levels of intake-air dilution may cause poor combustion stability at lower engine loads, resulting in increased hydrocarbon (HC) and carbon-monoxide (CO) emissions. Second, at high HP EGR flow rates, mass flow through the compressor is significantly reduced, making the compressor prone to surge. To address the first issue, uncooled (i.e., by-passed) HP EGR may be mixed into the intake air, for increased manifold air temperature (MAT). To address the second issue, LP EGR may be used. LP EGR provides increased flow through the compressor, protecting against surge, but is cooled on flowing through the charge-air cooler. In short, to achieve high MAT, exhaust may be routed through an uncooled HP EGR system, but that may cause surge. To avoid surge, the exhaust may be routed through a well-cooled LP EGR system, but this will increase HC and CO emissions. Meanwhile, supplementary or alternative use of cooled HP EGR may introduce further issues. For example, excessive fouling of an EGR cooler can occur when cooled HP EGR flow rate is allowed to fall below a suitable level.

At higher engine loads and speeds, still other issues arise. Flowing exhaust through an LP EGR loop increases the overall flow rate through the compressor, which may cause an over-speed condition and reduced compressor efficiency. This condition, if excessive, could lead to compressor choke. Flowing exhaust through an LP EGR loop also increases the gas temperature at the compressor inlet, which, in turn, increases compressor outlet temperature. On the other hand, uncooled HP EGR at high loads may cause excessive MAT, reducing engine power and/or causing an excessive outflow of smoke from the engine. These conditions may also make the compressor prone to surge.

Other, quite different issues arise during transient conditions. LP EGR, while improving turbocharger efficiency at lower engine loads, takes longer to purge from the intake system. This is because the purge volume includes not only the intake manifold, but everything from the intake manifold to the inlet of the compressor. HP EGR, while more easily purged from the intake manifold, reduces mass flow through the turbine. This reduces turbocharger speed, which increases lag. Thus, both EGR strategies can potentially degrade the engine's ability to respond to load and speed transients.

Further issues arise during catalyst warm up—another transient condition. Being very well cooled, LP EGR does not enable exhaust temperatures as high as uncooled HP EGR. Thus, in some cases catalyst light-off may be unacceptably delayed when running LP EGR. Uncooled HP EGR, on the other hand, enables higher exhaust temperatures but provides significantly reduced mass flow through the exhaust system. This can reduce the thermal energy in the exhaust and may also reduce the heat transfer coefficient.

The inventors herein have recognized these issues and the interrelationships between them, and have devised a series of approaches to address them. Therefore, one embodiment of this disclosure provides a method for charging an intake manifold of an engine. The method comprises adjusting an LP EGR flow rate and an uncooled HP EGR flow rate within first limits to maintain a target dilution level in the intake manifold at steady-state. The method further comprises adjusting the LP EGR and uncooled HP EGR rates within second limits, different from the first, to maintain the target dilution level in the intake manifold during transient conditions. In this manner, HP and LP EGR may be controlled coordinately during steady state and transient conditions. By dynamically changing the values that bracket the HP and LP EGR flow rates depending on conditions, engine longevity, fuel economy, and emissions control can be improved while enabling rapid response to transients.

It will be understood that the summary above is provided to introduce in simplified form a selection of concepts that are further described in the detailed description, which follows. It is not meant to identify key or essential features of the claimed subject matter, the scope of which is defined by the claims that follow the detailed description. Further, the claimed subject matter is not limited to implementations that solve any disadvantages noted herein.

DETAILED DESCRIPTION

Figure 1:
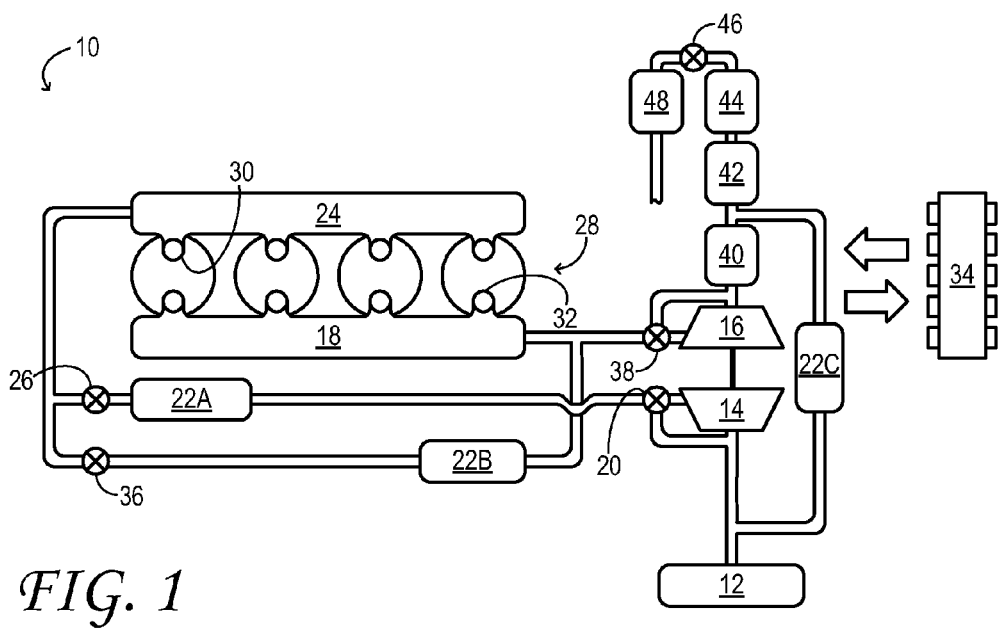
FIGS. 1 and 2 schematically show aspects of example motor-vehicle engine systems in accordance with embodiments of this disclosure.

The subject matter of this disclosure is now described by way of example and with reference to the illustrated embodiments listed above. Components, process steps, and other elements that may be substantially the same in one or more embodiments are identified coordinately and are described with minimal repetition. It will be noted, however, that elements identified coordinately may also differ to some degree. It will be further noted that the drawing figures included in this disclosure are schematic and generally not drawn to scale. Rather, the various drawing scales, aspect ratios, and numbers of components shown in the figures may be purposely distorted to make certain features or relationships easier to see.

FIG. 1 schematically shows aspects of an example engine system 10 in one embodiment. In engine system 10, air cleaner 12 is coupled to the inlet of compressor 14. The air cleaner inducts fresh air from the ambient and provides filtered, fresh air to the compressor. The compressor may be any suitable intake-air compressor—a motor or drive-shaft driven supercharger compressor, for example. In the embodiment illustrated in FIG. 1, however, the compressor is a turbocharger compressor mechanically coupled to turbine 16, the turbine driven by expanding engine exhaust from exhaust manifold 18. Blow-off valve 20 is coupled across the compressor from outlet to inlet, so that some or all of the compressed air charge from downstream of the compressor may be discharged to a locus upstream of the compressor. This action may be taken to avert or relieve compressor surge, for example. In one embodiment, the compressor and turbine may be coupled within a twin scroll turbocharger. In another embodiment, the compressor and turbine may be coupled within a variable geometry turbocharger (VGT), where turbine geometry is actively varied as a function of engine speed. In still other embodiments, the blow-off valve of the compressor may be configured to discharge the compressed air charge to another locus of the engine system.

In engine system 10, the outlet of compressor 14 is coupled to charge-air cooler 22A. In one embodiment, the charge-air cooler is a gas-to-liquid heat exchanger configured to cool the compressed air charge to temperatures suitable for admittance into intake manifold 24. In another embodiment, the charge-air cooler may be an air-to-air heat exchanger. Through intake throttle valve 26, the outlet of the charge-air cooler is coupled to the intake manifold.

Intake manifold 24 and exhaust manifold 18 are coupled, respectively, to a series of combustion chambers 28 through a series of intake valves 30 and exhaust valves 32. In one embodiment, each of the intake and exhaust valves may be electronically actuated. In another embodiment, each of the intake and exhaust valves may be cam actuated. Whether electronically actuated or cam actuated, the timing of intake and exhaust valve opening and closure may be adjusted as needed for desirable combustion and emissions-control performance. In particular, the valve timing may be adjusted so that combustion is initiated when a substantial amount of exhaust from a previous combustion is still present in one or more of the combustion chambers. Such adjusted valve timing may enable an 'internal EGR' mode useful for reducing peak combustion temperatures under selected operating conditions. In some embodiments, adjusted valve timing may be used in addition to the 'external EGR' modes described hereinafter.

FIG. 1 shows electronic control system 34. In embodiments where at least one intake or exhaust valve is configured to open and close according to an adjustable timing, the adjustable timing may be controlled via the electronic control system to regulate an amount of exhaust present in a combustion chamber at the time of ignition. To assess operating conditions in connection with various control functions of the engine system, the electronic control system may be operatively coupled to a plurality of sensors arranged throughout the engine system—flow sensors, temperature sensors, pedal-position sensors, pressure sensors, etc.

In combustion chambers 28 combustion may be initiated via spark ignition and/or compression ignition in any variant. Further, the combustion chambers may be supplied any of a variety of fuels: gasoline, alcohols, diesel, biodiesel, compressed natural gas, etc. Fuel may be supplied to the combustion chambers via direct injection, port injection, throttle-body injection, or any combination thereof.

In engine system 10, HP EGR cooler 22B is coupled downstream of exhaust manifold 18 and upstream of turbine 16. The HP EGR cooler is a gas-to-liquid heat exchanger configured to cool the exhaust to temperatures suitable for mixing into the compressed air charge. From the HP EGR cooler, HP exhaust flows through portioning valve 36 to intake manifold 24; the portioning valve controls the flow of recirculated exhaust through the external HP EGR path of the engine system. More generally, a portioning valve for controlling EGR may be located either upstream or downstream of an EGR cooler. Further, a cooler bypass line and valve may be included to provide an EGR path that does not flow through the cooler. This configuration, further described hereinafter, may be used to flow substantially uncooled HP EGR to the intake manifold.

Engine system 10 also includes waste gate 38, coupled across turbine 16 from inlet to outlet. Exhaust from exhaust manifold 18 flows to turbine 16 to drive the turbine, as noted above. When reduced turbine torque is desired, some exhaust may be directed instead through waste gate 38, by-passing the turbine. The combined flow from the turbine and the waste gate then flows through exhaust-aftertreatment devices 40, 42, and 44. The nature, number, and arrangement of the exhaust-aftertreatment devices may differ in the different embodiments of this disclosure. In general, the exhaust-aftertreatment devices may include at least one exhaust-aftertreatment catalyst configured to catalytically treat the exhaust flow, and thereby reduce an amount of one or more substances in the exhaust flow. For example, one exhaust-aftertreatment catalyst may be configured to trap NOX from the exhaust flow when the exhaust flow is lean, and to reduce the trapped NOX when the exhaust flow is rich. In other examples, an exhaust-aftertreatment catalyst may be configured to disproportionate NOX or to selectively reduce NOX with the aid of a reducing agent. In other examples, an exhaust-aftertreatment catalyst may be configured to oxidize residual hydrocarbons and/or carbon monoxide in the exhaust flow. Different exhaust-aftertreatment catalysts having any such functionality may be arranged in wash coats or elsewhere in the exhaust-aftertreatment devices, either separately or together. In one embodiment, the exhaust-aftertreatment devices may include a regenerable soot filter configured to trap and oxidize soot particles in the exhaust flow. In this and other embodiments, exhaust-aftertreatment device 40 may comprise a light-off catalyst and/or a three-way catalyst.

Continuing in FIG. 1, engine system 10 includes exhaust throttle valve 46. The exhaust throttle valve is an adjustable valve configured to control the exhaust pressure downstream of turbine 16. Such control may be used to regulate the flow of LP EGR (vide infra) or for other purposes. Silencer 48 is coupled downstream of the exhaust throttle valve. All or part of the treated exhaust flow from the exhaust aftertreatment devices may be released into the ambient via the silencer. Depending on operating conditions, however, some treated exhaust may be drawn instead through LP EGR cooler 22C. The LP EGR cooler is a gas-to-liquid heat exchanger configured to cool the exhaust to temperatures suitable for mixing into the intake air flow. From the LP EGR cooler, LP exhaust flows to the inlet of compressor 14. In the illustrated embodiment, the LP EGR flow may be controlled in part via exhaust throttle valve 46. Partial closure of the exhaust throttle valve increases the LP EGR flow potential in engine system 10.

In some embodiments, blow-off valve 20, intake throttle valve 26, portioning valve 36, waste gate 38, and exhaust throttle valve 46 may be electronically controlled valves configured to close and open at the command of electronic control system 34. Further, one or more of these valves may be continuously adjustable. The electronic control system may be operatively coupled to each valve and configured to command their opening, closure, and/or adjustment as needed to enact any of the control functions described herein.

By appropriately controlling portioning valve 36 and exhaust throttle valve 46, and by adjusting the exhaust and intake valve timing (vide supra), electronic control system 34 may enable engine system 10 to deliver intake air to combustion chambers 28 under varying operating conditions. These include conditions where EGR is omitted from the intake air or is provided internal to each combustion chamber (via adjusted valve timing, for example); conditions where EGR is drawn from a take-off point upstream of turbine 16 and delivered to a mixing point downstream of compressor 14 (external HP EGR); and conditions where EGR is drawn from a take-off point downstream of the turbine and delivered to a mixing point upstream of the compressor (external LP EGR).

Figure 2:
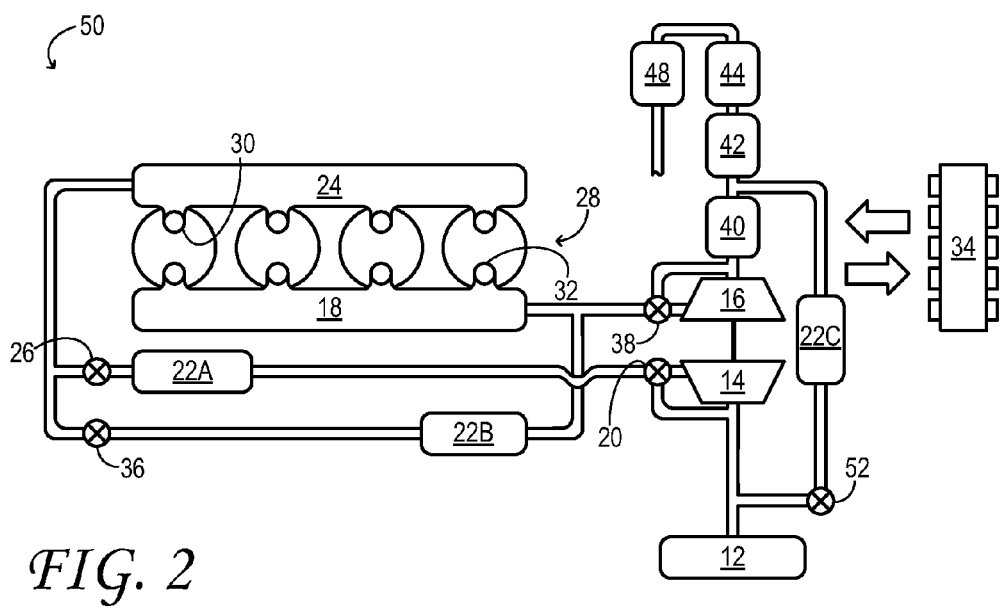

It will be understood that no aspect of FIG. 1 is intended to be limiting. In particular, take-off and mixing points for external HP and LP EGR may differ in embodiments fully consistent with the present disclosure. For example, while FIG. 2 shows external LP EGR being drawn from downstream of exhaust-aftertreatment device 40, the external LP EGR may in other embodiments be drawn from downstream of exhaust-aftertreatment device 44, or upstream of exhaust-aftertreatment device 40. Though not shown in any detail herein, the HP and LP EGR mixing points may comprise suitable gas-mixing architecture.

FIG. 2 schematically shows aspects of another example engine system 50 in one embodiment. Like engine system 10, engine system 50 includes an external HP EGR path and an external LP EGR path. In engine system 50, however, portioning valve 52 is coupled downstream of LP EGR cooler 22C and is used to control the LP EGR flow rate. Accordingly, engine system 50 does not include an exhaust throttle valve. Naturally, it will be understood that other embodiments fully consistent with this disclosure may include both a portioning valve in the LP EGR path as well as an exhaust throttle valve.

Figure 3:
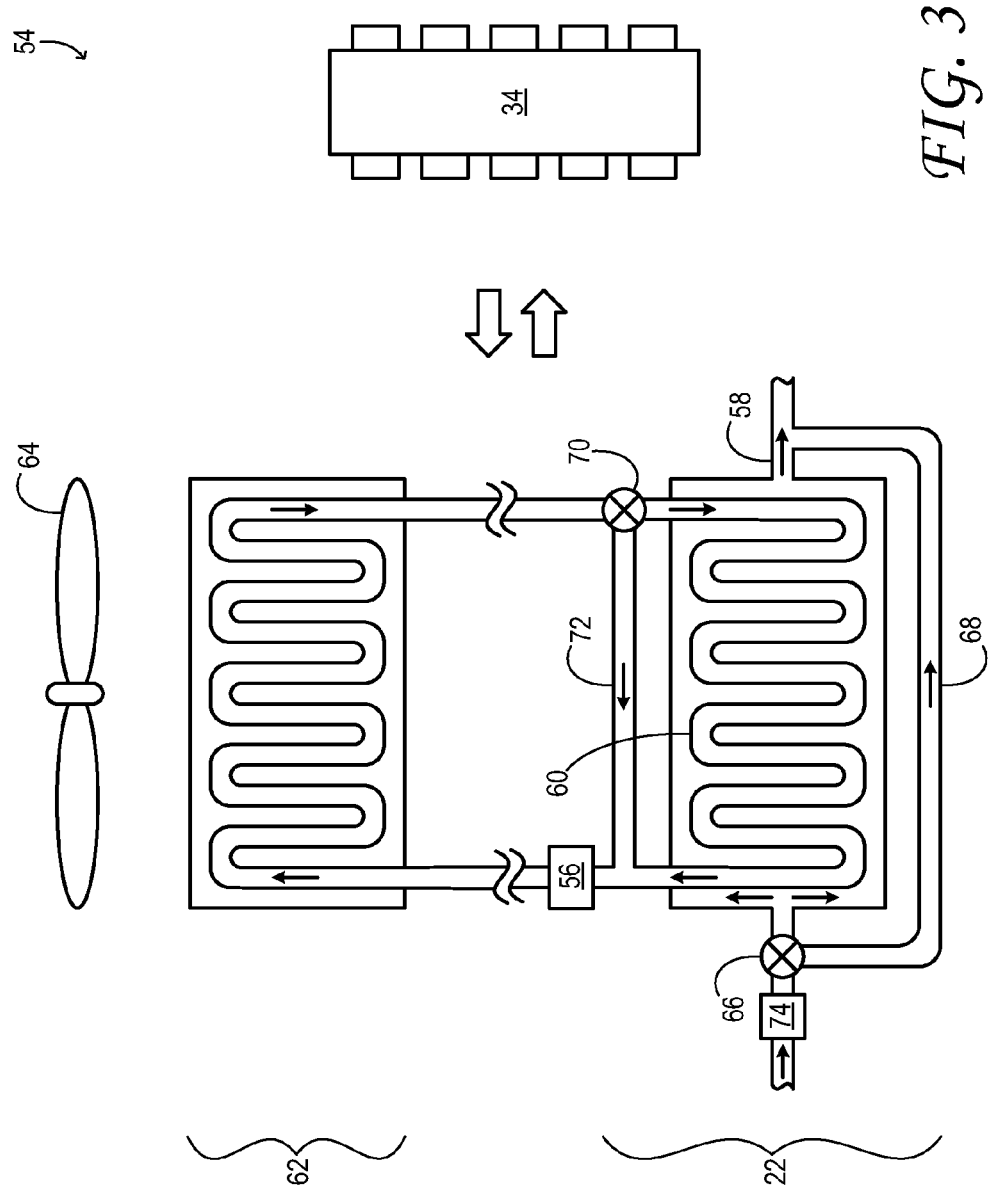
FIG. 3 schematically shows aspects of an example motor-vehicle cooling system in accordance with an embodiment of this disclosure.

FIG. 3 schematically shows aspects of an example cooling system 54 of a motor vehicle. The cooling system includes coolant pump 56. The coolant pump is configured to force a liquid engine coolant—water or a water-based antifreeze solution, for example—through conduits that link various cooling-system components. The cooling system also includes heat exchanger 22. Example heat exchangers may include charge-air cooler 22A, HP EGR cooler 22B, LP EGR cooler 22C, or virtually any other gas-to-liquid heat exchanger of a motor-vehicle engine system.

Heat exchanger 22 includes internal gas conduit 58 for conducting a gas flow—an air or exhaust flow, for example. The heat exchanger also includes internal coolant conduit 60 for conducting the liquid engine coolant. As shown in FIG. 3, the internal coolant conduit of the heat exchanger is a segment of a closed coolant loop. The closed coolant loop includes radiator 62 and other engine components. In one embodiment, the closed coolant loop may include a plurality of cylinder jackets of the engine system in which cooling system 54 is installed.

In heat exchanger 22, the internal gas and coolant conduits are configured to enhance the rate of heat exchange between the gas and liquid flowing inside them. To this end, the heat exchanger may provide an extended (e.g., tortuous) shared interfacial area between the conduits. Similarly, the coolant conduit of radiator 62 may be configured for enhanced heat exchange with the ambient air. In the embodiment shown in FIG. 3, fan 64 is arranged opposite the radiator and configured to increase convection of the ambient air around and through the radiator.

Under some conditions, cooling system 54 may be configured to controllably limit the rate of heat exchange in heat exchanger 22 and/or radiator 62. Such control may be provided via electronic control system 34 or any electronic control system of the vehicle in which cooling system 54 is installed. In the embodiment illustrated in FIG. 3, the heat exchanger includes two-way by-pass valve 66, which controllably diverts a portion of the gas flow through external gas conduit 68. The heat exchanger also includes two-way by-pass valve 70, which controllably diverts a portion of the coolant flow through external coolant conduit 72. The two-way by-pass valves may be electronically controlled portioning valves, for example. In the illustrated embodiment, two-way by-pass valve 70 provides two flow positions: a first position where coolant from the radiator flows through internal coolant conduit 60 of heat exchanger 22, and a second position where coolant from the radiator flows through external coolant conduit 72. Two-way by-pass valve 66 also provides two flow positions: a first position where the gas flows through internal gas conduit 58 of the heat exchanger, and a second position where the gas flows through external gas conduit 68.

The two-way by-pass valves may be actuated via electronic control system 34. The electronic control system may effect a decrease in the rate of heat exchange by increasing the amount of gas or coolant that is diverted through the by-pass conduits, or vice versa. Likewise, coolant pump 56 and fan 64 may be operatively coupled to the electronic control system. The electronic control system may be configured to vary the speed of the coolant pump and the fan in order to provide the desired rate of heat exchange between the coolant and the ambient air.

In the embodiments contemplated herein, electronic control system 34 may be configured to vary any or all of the above rates of heat exchange in order to maintain the overall performance of cooling system 54 and of the engine system in which the cooling system is installed. Accordingly, cooling system 54 includes sensor 74 operatively coupled to the electronic control system. The electronic control system is configured to interrogate the sensor to determine the temperature of the uncooled gas flow. Based on the sensor response and on other factors, the electronic control system may determine whether the gas should flow through internal gas conduit 58 of the heat exchanger or be diverted through external gas conduit 68.

Electronic control system 34 may determine whether the gas should flow through the heat exchanger or through the by-pass conduit in view of other conditions as well. When heat exchanger 22 is an HP EGR cooler, for example, routing the exhaust flow through the internal gas conduit of the heat exchanger enables a cooled HP EGR mode. On the other hand, routing the exhaust flow through the by-pass conduit enables an uncooled (i.e., by-passed) HP EGR mode. These modes may be used under different circumstances, as further described hereinafter. Further, in cooling systems fully contemplated herein, two-way by-pass valve 66 may be a portioning valve configured to divert a controlled portion of the HP EGR to flow through external gas conduit 68 while allowing the balance of the HP EGR to flow through the internal gas conduit. In this manner, any desired split between cooled and uncooled EGR may be selected.

Naturally, it will be understood that FIG. 3 shows only a portion of one example cooling system, and that other, more complex cooling systems may be used. Although FIG. 3 shows only one heat exchanger in cooling system 54, a plurality of heat exchangers may be included—EGR coolers and charge-air coolers, for example. Arranged fluidically in series or in parallel, the plurality of coolers may each conduct the same, radiator-cooled engine coolant. In other embodiments, the cooling system may comprise a plurality of non-communicating coolant loops.

The configurations described above enable various methods for charging an intake manifold of an engine. Accordingly, some such methods are now described, by way of example, with continued reference to above configurations. It will be understood, however, that the methods here described, and others fully within the scope of this disclosure, may be enabled via other configurations as well. The methods presented herein include various measuring and/or sensing events enacted via one or more sensors disposed in the engine system. The methods also include various computation, comparison, and decision-making events, which may be enacted in an electronic control system operatively coupled to the sensors. The methods further include various hardware-actuating events, which the electronic control system may command selectively, in response to the decision-making events.

Figure 4:
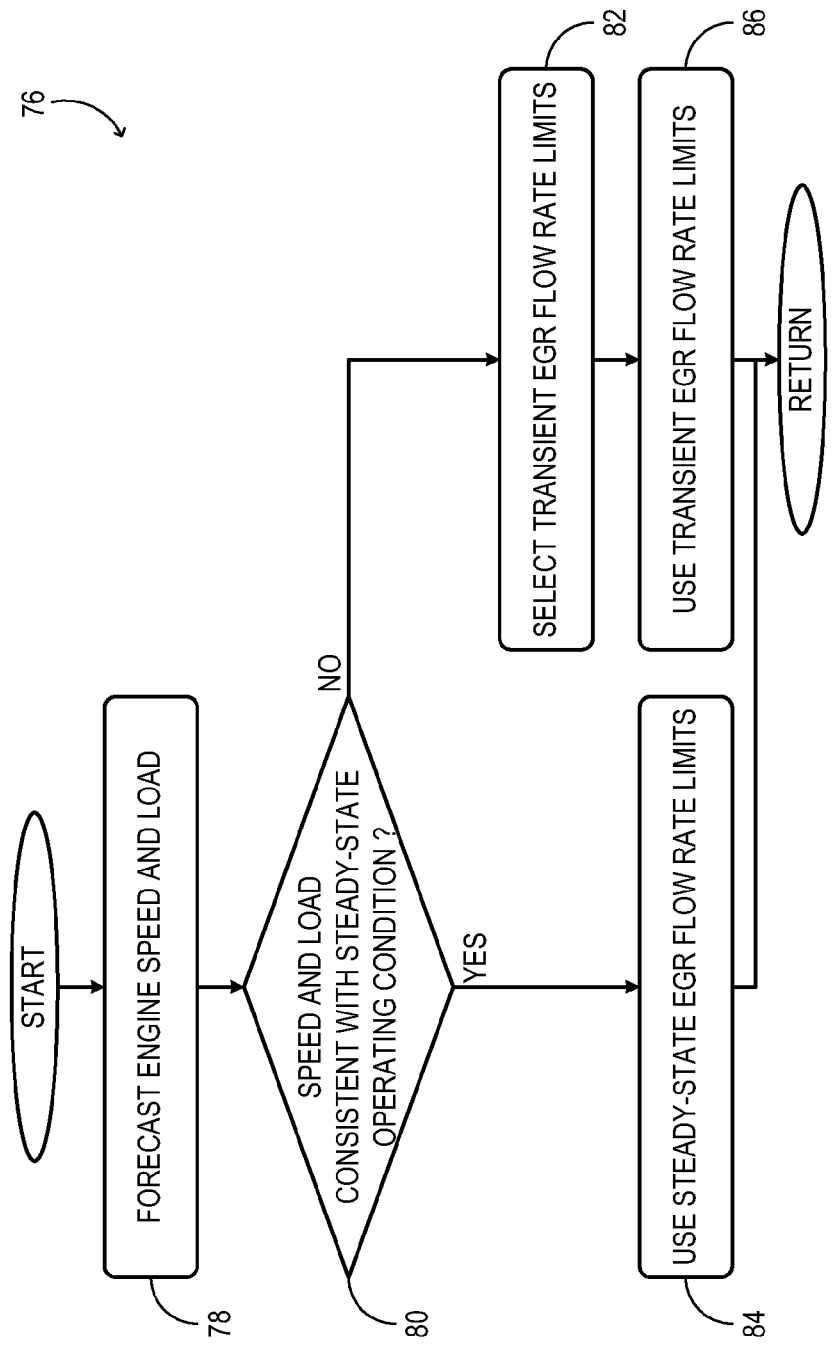
FIGS. 4-8 illustrate example methods for charging an intake manifold of an engine system in accordance with different embodiments of this disclosure.

FIG. 4 illustrates an example method 76 for charging an intake manifold of an engine system in one embodiment. At 78 the engine speed and engine load are forecast. To this end, the electronic control system may interrogate one or more engine-system sensors responsive to the current engine speed and load. In other embodiments, suitable related metrics such as mass air flow, fuel-injection amount, and/or inner torque may sensed and used to compute an effective engine speed and load. These in combination with a metric responsive to driver engine-torque demand—e.g., a pedal position—may be sensed and used to provide a forecast of the engine speed and load.

At 80 it is determined whether the forecast engine speed and load are consistent with steady-state operating conditions of the engine. If the engine speed or load are not consistent with steady-state operating conditions, then the method advances to 82, where transient EGR flow-rate limits are selected based on the forecast speed and load. Otherwise, the method advances to 84, where steady-state EGR flow-rate limits are used to control EGR.

At steady state, EGR flow rate limits may be defined in view of several objectives, such as avoiding undesirable operating conditions: compressor surge, choke, and intake overheating, as examples. While avoiding these conditions, the steady-state limits may further serve to maintain combustion stability and compressor efficiency, and to control emissions. Thus, one embodiment sets the steady-state EGR flow-rate limits as follows: the lower limit for the LP EGR flow rate corresponds to a minimum value needed to prevent compressor surge; the upper limit for the LP EGR flow rate corresponds to a maximum value that will avert choke and compressor overheating; the lower limit for the uncooled HP EGR flow rate corresponds to a minimum value that will provide combustion stability; the upper limit for the LP EGR corresponds to a maximum value that will avert intake overheating and excessive outflow of smoke from the engine. In this and other embodiments, a lower limit for the cooled HP EGR flow rate corresponds to a minimum value consistent with avoiding excessive fouling of the HP EGR cooler. With steady state limits defined in this manner, the LP EGR flow rate and the uncooled HP EGR flow rate may be adjusted within the steady-state limits to maintain a target dilution level, dilution rate, and/or burnt gas fraction in the intake manifold, as further described hereinafter. It will be understood, however, that this particular approach should not be considered in a limiting sense; in another example embodiment, the upper and/or lower flow-rate limits for LP EGR may be set not merely to avoid deliterious effects such as choke and surge, but also to preserve turbocharger and/or engine system efficiency. Thus, the upper and lower flow-rate limits for LP EGR may be set to maintain a margin against less efficient operation of the turbocharger compressor, by biasing the compressor toward the speed/pressure-ratio region of highest efficiency. In another embodiment, the limits may be set to optimize overall engine system efficiency (i.e., fuel economy). In yet another embodiment, the limits may be set to optimize any aspect of emissions-control performance—e.g., NOX control performance.

Method 76 arrives at 82 when it has been determined that the engine is undergoing a load or speed transient for which the above steady-state EGR flow rate limits may not be sufficient or appropriate. This method contemplates a number of different transient conditions. Like the steady-state flow-rate limits, each set of transient flow-rate limits may comprise an LP EGR lower flow-rate limit, an LP EGR upper flow-rate limit, an uncooled HP EGR lower flow-rate limit, and an uncooled HP EGR upper flow-rate limit. These limits may differ from each other and from the steady-state limits referred to hereinabove.

Tip-in is one example transient condition. During tip-in, the upper flow-rate limits for cooled and uncooled HP EGR may be decreased relative to their steady-state values. Decreasing these upper limits may enable faster spool up of the compressor by limiting exhaust-pressure loss through the HP EGR loop. Similarly, the lower flow-rate limits for cooled and uncooled HP EGR may be decreased relative to their steady-state values. For brief periods of tip-in, the engine may tolerate the non-ideal conditions noted above that issue from HP EGR flow rates dropping below their steady-state lower flow-rate limits. In addition, since the HP EGR mixing point is closer to the intake manifold, changes in HP EGR will more quickly elicit changes in intake manifold composition. Thus, decreasing HP EGR during a transient will more quickly allow the engine to reach a new target, which is likely to be lower during the higher-load condition.

Tip-out is another example transient condition. During tip-out, the lower LP EGR flow-rate limit may be increased relative to its steady-state value. Increasing this limit may allow more turbocharger inertia to be preserved despite the decreasing engine load. Accordingly, when engine load increases again, the compressor will already be spun up to a higher level than the steady-state flow-rate limits would have allowed. In this manner, operating above the LP EGR lower limit maintains turbine inertia at a level that enables sufficiently rapid increase of boost. In another embodiment, the LP EGR lower flow-rate limit may be increased to a value that effectively suppresses transient NOX spikes in the engine feed gas. In these and other embodiments, combustion stability in the engine system may be enhanced (vide infra) when the LP EGR lower flow-rate limit is increased during tip-out conditions.

Open intake-throttle is another transient condition. During open intake-throttle conditions, the lower flow-rate limit for cooled HP EGR may be increased relative to its steady-state value. Increasing this limit may increase the rate of cooled HP EGR relative to LP EGR under conditions of transiently high engine load. Accordingly, when the load decreases again, and the engine can no longer tolerate the high level of intake-air dilution level, the EGR diluent will be drawn out more rapidly: less of it will be filling the longer LP EGR path, and more will be filling the shorter HP EGR path, as compared to steady-state conditions. In this manner, operating above the uncooled HP EGR lower limit may enable a more rapid purge of the intake manifold, as needed to exit from the transient open intake-throttle condition.

Catalyst warm-up (e.g., cold start) is another transient condition. During catalyst warm-up, the lower flow-rate limits for uncooled HP EGR and LP EGR may be increased relative to their steady-state values. Increasing these limits may facilitate rapid warm-up of the catalysts according to a heat-transfer model that requires increased levels of both EGR flow rates. It will be noted that uncooled HP EGR enables higher exhaust temperatures, while LP EGR provides increased exhaust flow. A suitable heat-transfer model for catalyst warm-up may take both of these effects into account to minimize the time required for catalyst light-off.

Returning now to FIG. 4, at 86 the transient EGR flow-rate limits selected are used to control EGR. Accordingly, the LP EGR flow rate and the uncooled HP EGR flow rate may be adjusted within the transient limits selected to maintain a target dilution level in the intake manifold, as further described hereinafter. From 86 or 84 the method returns.

Figure 5:
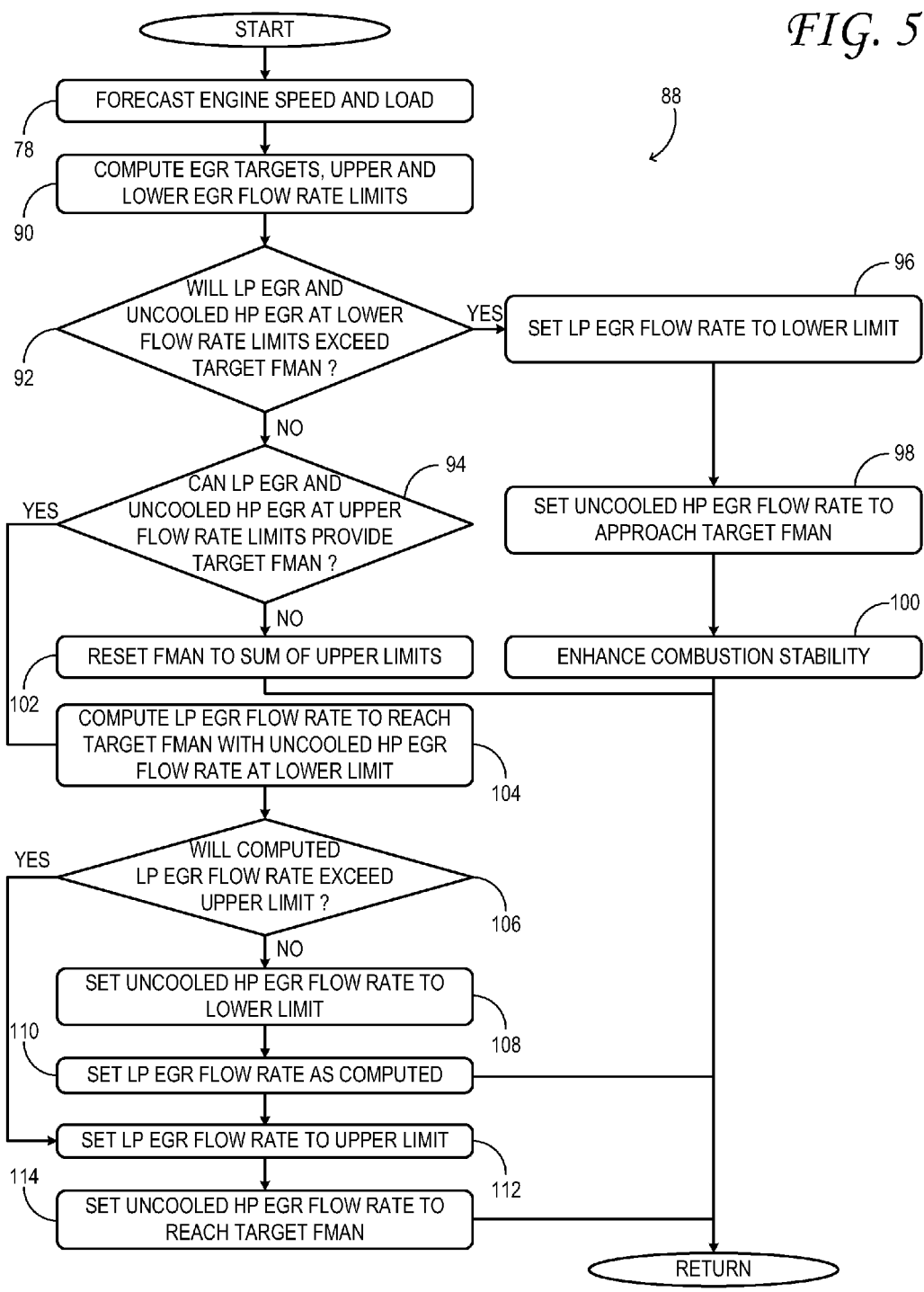

FIG. 5 illustrates another example method 88 for charging an intake manifold of an engine system in one embodiment. Method 88 may be enacted in an engine system in which LP EGR and uncooled HP EGR are enabled. In other words, the engine system may be one that lacks an HP EGR cooler.

At 78 the engine speed and engine load are forecast. At 90 one or more EGR target levels are computed, along with upper and lower EGR flow-rate limits. In one embodiment, the computed EGR target levels include a target FMAN. FMAN is inversely related to the relative amount (e.g., partial pressure) of oxygen in the intake manifold. As such, FMAN varies as the ratio of recirculated exhaust to fresh air in the intake manifold, but also takes into account the relative amount of oxygen in the recirculated exhaust. The target FMAN may be computed based on either the measured relative amount of oxygen in the intake manifold or on the EGR rate and exhaust oxygen level. The EGR rate, in turn, could be determined from speed-density using the engine speed, mass air flow, and the manifold air pressure and temperature. In method 88, the EGR flow-rate limits may be computed at 90 substantially as described in the context of method 76, above.

Continuing in FIG. 5, at 92 it is determined whether LP EGR and uncooled HP EGR at their respective lower flow-rate limits will exceed the target FMAN—i.e., whether admitting the EGR at these minimal rates will provide too little oxygen in the intake manifold. If LP EGR and uncooled HP EGR at their respective lower flow-rate limits will not exceed the target FMAN, then the method advances to 94. Otherwise, the method advances to 96. At 96 the LP EGR flow rate is set to its lower limit. At 98 the uncooled HP EGR flow rate is set to a level that, in combination with LP EGR flow rate at its lower limit, results in the intake manifold dilution level approaching the target FMAN. Then, at 100, combustion stability in the engine system is enhanced. In the various embodiments contemplated herein, the combustion stability may be enhanced by adjusting the start-of-injection (SOI), by reducing the total amount of EGR, by increasing a pilot quantity, or by adding an additional pilot, as examples.

At 94 it is determined whether LP EGR and uncooled HP EGR at their respective upper flow-rate limits can provide enough EGR to reach the target FMAN. If not, then the method advances to 102, where the target FMAN is reset to the sum of the upper limits. This action is taken to protect the engine against undesired effects: compressor choke, engine overheating, intake-manifold overheating and excessive outflow of soot. However, if the LP EGR and uncooled HP EGR at their respective upper flow-rate limits can provide enough EGR to reach the target FMAN, then the method advances to 104. At 104 an LP EGR flow rate is computed, which, in combination with the uncooled HP EGR flow rate at its lower limit, would result in the intake-manifold dilution level converging on the target FMAN. At 106 it is determined whether the computed LP EGR flow rate exceeds the upper flow-rate limit for LP EGR. If not, then the method advances to 108, where the uncooled HP EGR flow rate is set to its lower limit, and to 110, where the LP EGR flow rate is set to the computed value. However, if the computed value does exceed the upper flow-rate limit, then the method advances to 112, where the LP EGR flow rate is set to its upper limit, and to 114, where the uncooled HP EGR flow rate is set to a value that, in combination with the LP EGR flow rate at is upper limit, results in the intake-manifold dilution level converging on the target FMAN. Thus, the method shows two particular instances in which the uncooled HP EGR flow rate is minimized, subject to a lower flow-rate limit, to achieve a target dilution level when combined with LP EGR flow rate subject to an upper flow-rate limit. From 100, 102, 110 or 114, the method returns.

Figure 6:
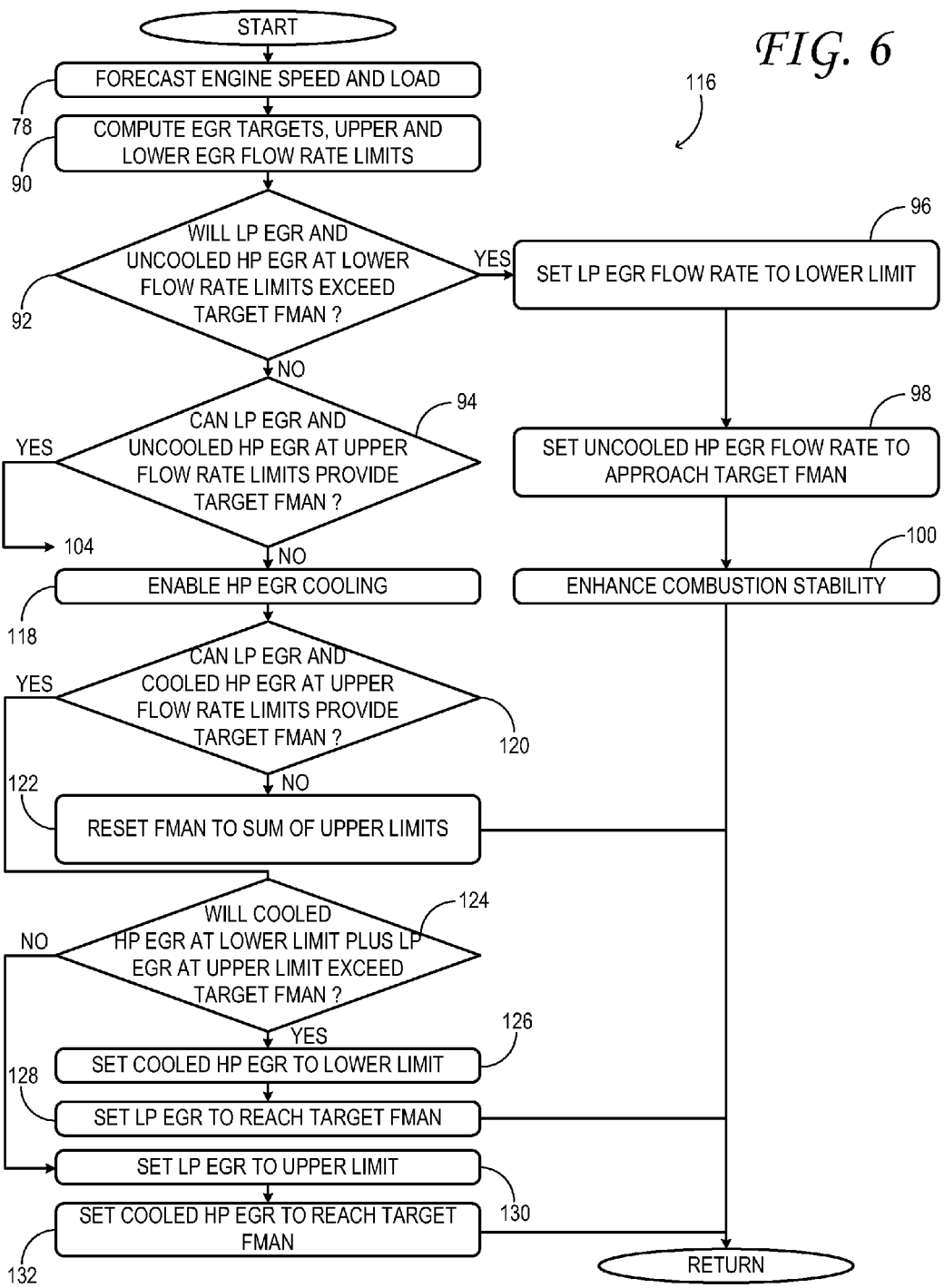

FIG. 6 illustrates another example method 116 for charging an intake manifold of an engine system in one embodiment. Method 116 may be enacted in an engine system in which LP EGR, uncooled HP EGR, and cooled HP EGR are all enabled. In other words, the engine system may be one that has an HP EGR cooler that can be fully or partially by-passed.

Method 116 begins in the same manner as method 88, above. In method 116, however, if it is determined at 94 that LP EGR and uncooled HP EGR at their respective upper flow-rate limits cannot provide the target FMAN, then the method advances to 118, where HP EGR cooling is enabled. HP EGR cooling may be enabled by closure of an HP EGR cooler by-pass valve, for example. The method then advances to 120, where it is determined whether LP EGR and cooled HP EGR at their upper flow-rate limits can provide the target FMAN. If not, then the method advances to 122, where the target FMAN is reduced to correspond to the sum of the upper flow rate limits—to avoid compressor choke, compressor over-temperature, and excessive outflow of soot, for example. However, if LP EGR and cooled HP EGR at their upper flow-rate limits can provide the target FMAN, then the method advances to 124. At 124 it is determined whether the combined effect of cooled HP EGR at its lower flow-rate limit and LP EGR at its upper flow-rate limit would exceed the target FMAN. If so, then the method advances to 126, where the cooled HP EGR flow rate is set to its lower flow-rate limit, and to 128 where the LP EGR flow rate is set to a value that, in combination with the cooled HP EGR flow rate at is lower limit, results in the intake-manifold dilution level converging on the target FMAN. However, if the combined effect of cooled HP EGR at its lower flow-rate limit and LP EGR at its upper flow-rate limit would not exceed the target FMAN, then the method advances to 130, where the LP EGR flow rate is set to its upper limit. The method then advances to 132, where the HP EGR flow rate is set to a value that, in combination with the LP EGR flow rate at is upper limit, results in the intake-manifold dilution level converging on the target FMAN. Thus, the method shows two particular instances in which the cooled HP EGR flow rate is minimized, subject to a lower flow-rate limit, to achieve a target dilution level when combined with LP EGR flow rate subject to an upper flow-rate limit. From 100, 122, 128, or 132, method 116 returns.

Figure 7:
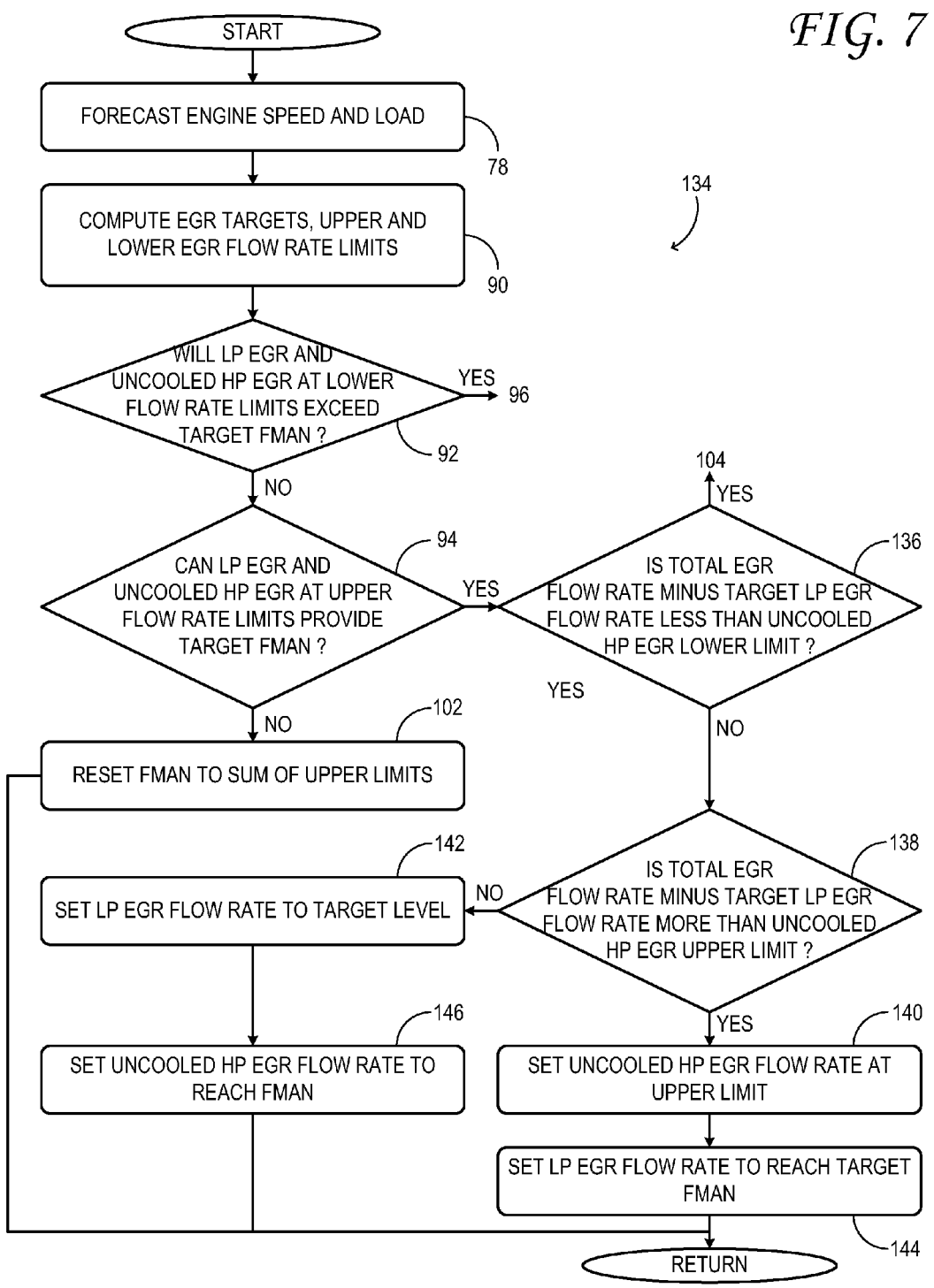

FIG. 7 illustrates another example method 134 for charging an intake manifold of an engine system in one embodiment. Method 134 may be enacted in an engine system as referred to in the context of method 88. Accordingly, method 134 begins in the same manner as method 88. In method 134, however, computing the EGR targets at 90 further comprises computing a target LP EGR flow rate. In one embodiment, the target LP EGR flow rate may be computed based on efficiency; it may be the flow rate that optimizes turbocharger efficiency and/or engine system efficiency, for example.

At 94 of method 134, if it is determined that LP EGR and uncooled HP EGR at their respective upper flow-rate limits can provide the target FMAN, then the method advances to 136. At 136 it is determined whether the total EGR flow rate (i.e., the flow rate corresponding to the target FMAN) minus the computed target LP EGR flow rate is less than the lower flow-rate limit for uncooled HP EGR. If so, then the method advances to 104 (vide supra). Otherwise, the method advances to 138. At 138 it is determined whether the total EGR flow rate minus the target LP EGR flow rate is greater than the upper flow-rate limit for uncooled HP EGR. If so, then the method advances to 140; otherwise, the method advances to 142. At 140 the uncooled HP EGR flow rate is set to its upper flow-rate limit, and at 144, the LP EGR flow rate is set to a level that, in combination with the uncooled HP EGR flow rate at its upper flow-rate limit, results in the intake-manifold dilution level converging on the target FMAN. At 142 the LP EGR flow rate is set to its target level, and at 146, the uncooled HP EGR flow rate is set to a level that, in combination with the LP EGR flow rate at its target level, results in the intake-manifold dilution level converging on the target FMAN. From 102, 144, or 146, the method returns.

Figure 8:
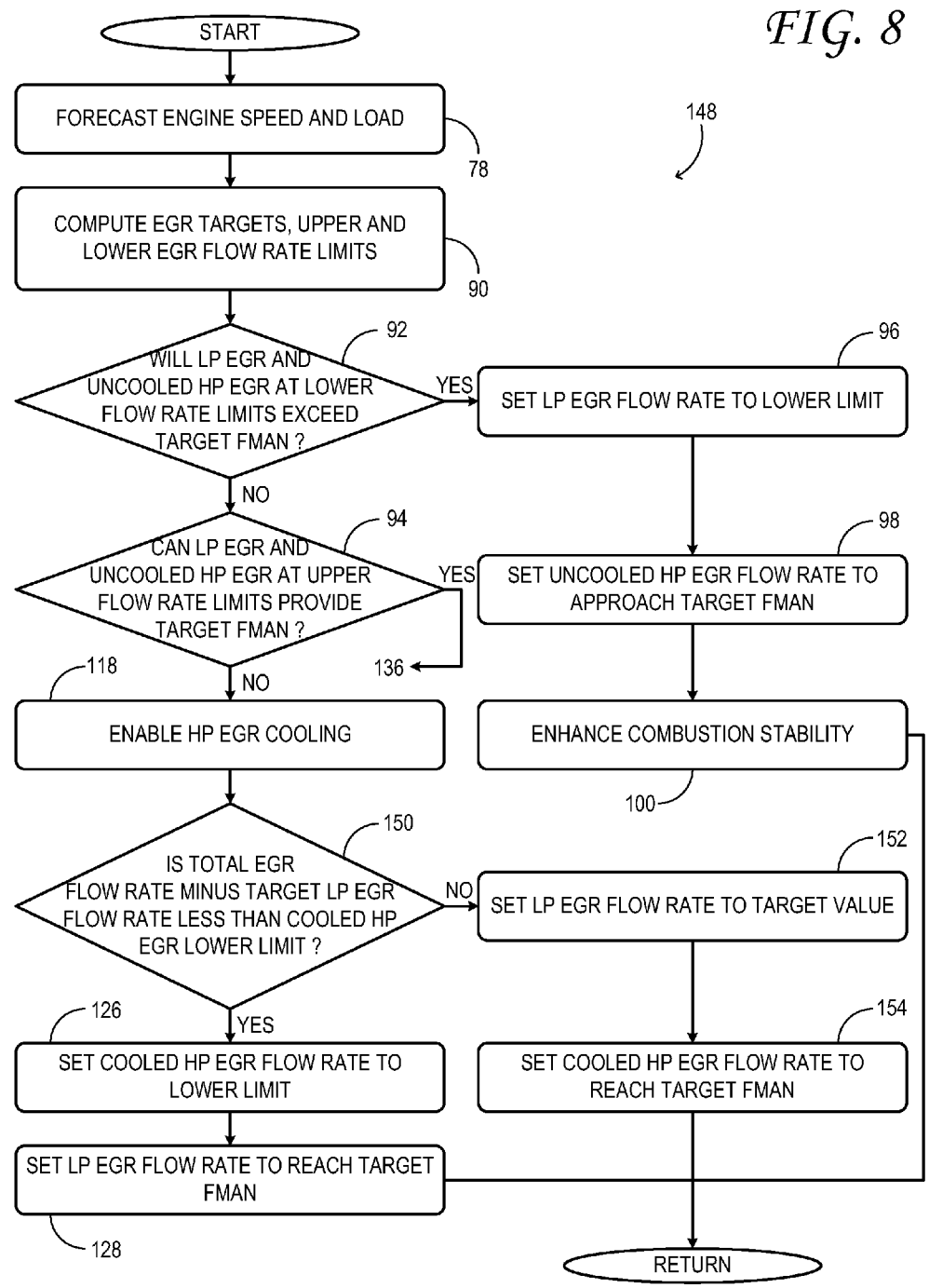

FIG. 8 illustrates another example method 148 for charging an intake manifold of an engine system in one embodiment. Method 148 may be enacted in an engine system as described above in the context of method 134.

Accordingly, method 148 begins in the same manner as method 134. In method 148, however, if it is determined at 94 that LP EGR and uncooled HP EGR at their respective upper flow-rate limits cannot provide the target FMAN, then the method advances to 118, where HP EGR cooling is enabled. The method then advances to 150, where it is determined whether the total EGR flow rate (i.e., the flow rate corresponding to the target FMAN) minus the target LP EGR flow rate is less than the cooled HP EGR lower flow-rate limit. If so, then the method advances to 126; otherwise, the method advances to 152. At 126 the cooled HP EGR flow rate is set to its lower limit, and at 154, the cooled HP EGR flow rate is set to a level that, in combination with the cooled HP EGR set to its lower flow rate limit, causes the intake-manifold dilution level to converge on the target FMAN. At 152 the LP EGR flow rate is set to its target value, and at 128, the LP EGR flow rate is set to a level that, in combination with the foregoing EGR rates set to the levels specified, cause the intake-manifold dilution level to converge on the target FMAN. From 100, 154, or 128, the method returns.

It will be understood that the example control and estimation routines disclosed herein may be used with various system configurations. These routines may represent one or more different processing strategies such as event-driven, interrupt-driven, multi-tasking, multi-threading, and the like. As such, the disclosed process steps (operations, functions, and/or acts) may represent code to be programmed into computer readable storage medium in an electronic control system.

It will be understood that some of the process steps described and/or illustrated herein may in some embodiments be omitted without departing from the scope of this disclosure. Likewise, the indicated sequence of the process steps may not always be required to achieve the intended results, but is provided for ease of illustration and description. One or more of the illustrated actions, functions, or operations may be performed repeatedly, depending on the particular strategy being used.

Finally, it will be understood that the systems, and methods described herein are exemplary in nature, and that these specific embodiments or examples are not to be considered in a limiting sense, because numerous variations are contemplated. Accordingly, this disclosure includes all novel and non-obvious combinations and sub-combinations of the various, systems, and methods disclosed herein, as well as any and all equivalents thereof.

The invention claimed is:

1. A method for charging an intake manifold of an engine, comprising:
   adjusting an LP EGR flow rate and an uncooled HP EGR flow rate within first limits to maintain a target dilution level in the intake manifold at steady-state;
   adjusting the LP EGR and uncooled HP EGR rates within second limits, different from the first, to maintain the target dilution level in the intake manifold during transient conditions; and
   when the target dilution level is exceeded with the LP EGR and uncooled HP EGR rates at their respective lower flow-rate limits:
      setting the LP EGR flow rate to its lower limit;
      setting the uncooled HP EGR flow rate to a level that, in combination with the LP EGR flow rate at its lower limit, results in an intake-manifold dilution level approaching the target level; and
      enhancing a combustion stability of the engine.

2. The method of claim 1 further comprising, when the target dilution level cannot be maintained with the LP EGR and uncooled HP EGR rates at their respective upper limits, resetting the target dilution level to the sum of the upper limits.

3. The method of claim 1 further comprising maintaining the LP EGR flow rate at a target flow rate computed based on turbocharger and/or engine-system efficiency.

4. A method for charging an intake manifold of an engine, comprising:
   adjusting an LP EGR flow rate and an uncooled HP EGR flow rate within first limits to maintain a target dilution level in the intake manifold at steady-state;
   adjusting the LP EGR and uncooled HP EGR rates within second limits, different from the first, to maintain the target dilution level in the intake manifold during transient conditions; and
   when the target dilution level is not exceeded with the LP EGR and uncooled HP EGR rates at their respective lower limits, and when the LP EGR and uncooled HP EGR rates at their respective upper limits can maintain the target dilution level:
      setting the uncooled HP EGR flow rate to its lower limit; and
      setting the LP EGR flow rate to a level that, in combination with the uncooled HP EGR flow rate at its lower limit, results in an intake-manifold dilution level converging on the target dilution level.

5. A method for charging an intake manifold of an engine, comprising:

adjusting an LP EGR flow rate and an uncooled HP EGR flow rate within first limits to maintain a target dilution level in the intake manifold at steady-state;

adjusting the LP EGR and uncooled HP EGR rates within second limits, different from the first, to maintain the target dilution level in the intake manifold during transient conditions; and when the target dilution level is not exceeded with the LP EGR and uncooled HP EGR rates at their respective lower limits, and when the LP EGR and uncooled HP EGR rates at their respective upper limits can maintain the target dilution level:

setting the LP EGR flow rate to its upper limit; and setting the uncooled HP EGR flow rate to a level that, in combination with the LP EGR flow rate at its upper limit, results in an intake-manifold dilution level converging on the target dilution level.

* * * * *